United States Patent [19]

Marsh et al.

[11] Patent Number: 5,537,105
[45] Date of Patent: Jul. 16, 1996

[54] ELECTRONIC IDENTIFICATION SYSTEM

[75] Inventors: Michael J. C. Marsh; Andrzej Lenarcik, both of Johannesburg, South Africa

[73] Assignee: British Technology Group Limited, London, England

[21] Appl. No.: 816,893

[22] Filed: Jan. 3, 1992

[30] Foreign Application Priority Data

Jan. 4, 1991 [ZA] South Africa ........................... 91/0078
Jul. 22, 1991 [ZA] South Africa ........................... 91/5733

[51] Int. Cl.$^6$ ............................... G07C 9/00; G06K 7/08
[52] U.S. Cl. ................... 340/825.54; 340/825.5; 340/505
[58] Field of Search ............. 340/825.54, 825.49, 340/825.31, 825.34, 825.08, 825.5, 505; 342/42, 44; 235/380; 455/41

[56] References Cited

U.S. PATENT DOCUMENTS

| | | |
|---|---|---|
| 3,981,011 | 9/1976 | Bell, III . |
| 4,614,945 | 9/1986 | Brunius et al. . |
| 4,631,708 | 12/1986 | Wood et al. . |
| 4,691,202 | 9/1987 | Denne et al. ........................ 340/825.5 |
| 5,150,114 | 9/1992 | Johansson . |

FOREIGN PATENT DOCUMENTS

| | | |
|---|---|---|
| 0161779 | 11/1985 | European Pat. Off. . |
| 0285419 | 10/1988 | European Pat. Off. . |
| 0301127 | 2/1989 | European Pat. Off. . |
| 0405695 | 1/1991 | European Pat. Off. . |
| 0467036A2 | 1/1992 | European Pat. Off. . |
| 2354067 | 5/1975 | Germany . |
| 85/6178 | 8/1985 | South Africa . |
| 2116808 | 9/1983 | United Kingdom . |
| WO90/15343 | 12/1990 | WIPO . |

Primary Examiner—John K. Peng
Assistant Examiner—Andrew Hill
Attorney, Agent, or Firm—Lowe, Price, Leblanc & Becker

[57] ABSTRACT

An identification system comprises an interrogator and a number of transponders. The interrogator includes a transmitter for transmitting an interrogation signal to the transponder, and a receiver for receiving a response signal from the transponder. A micro-processor identifies the transponder from data in the response signal. Each transponder comprises a receiving antenna for receiving the interrogation signal, a code generator, a transmitting antenna, and a modulator connected to the code generator. On receipt of the interrogation signal the transponder repeatedly transmits a response signal containing data which identifies the transponder. The interrogator detects successful identification of any transponder and briefly interrupts the interrogation signal to indicate the successful identification. Each transponder includes a logic circuit responsive to a respective interruption in the interrogation signal to cease transmission of its own response signal.

47 Claims, 8 Drawing Sheets

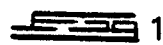
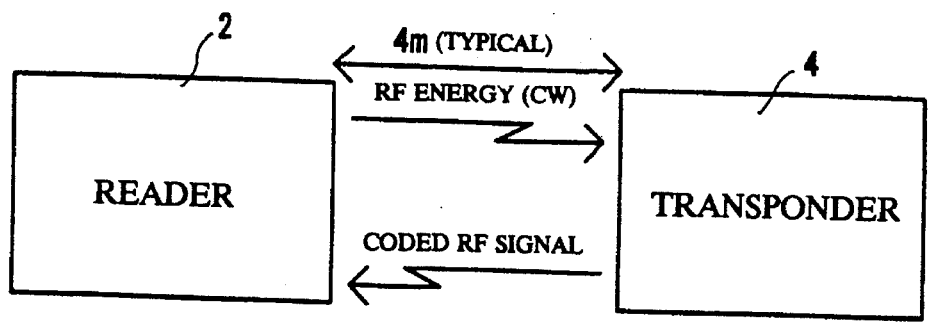
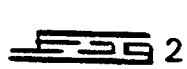
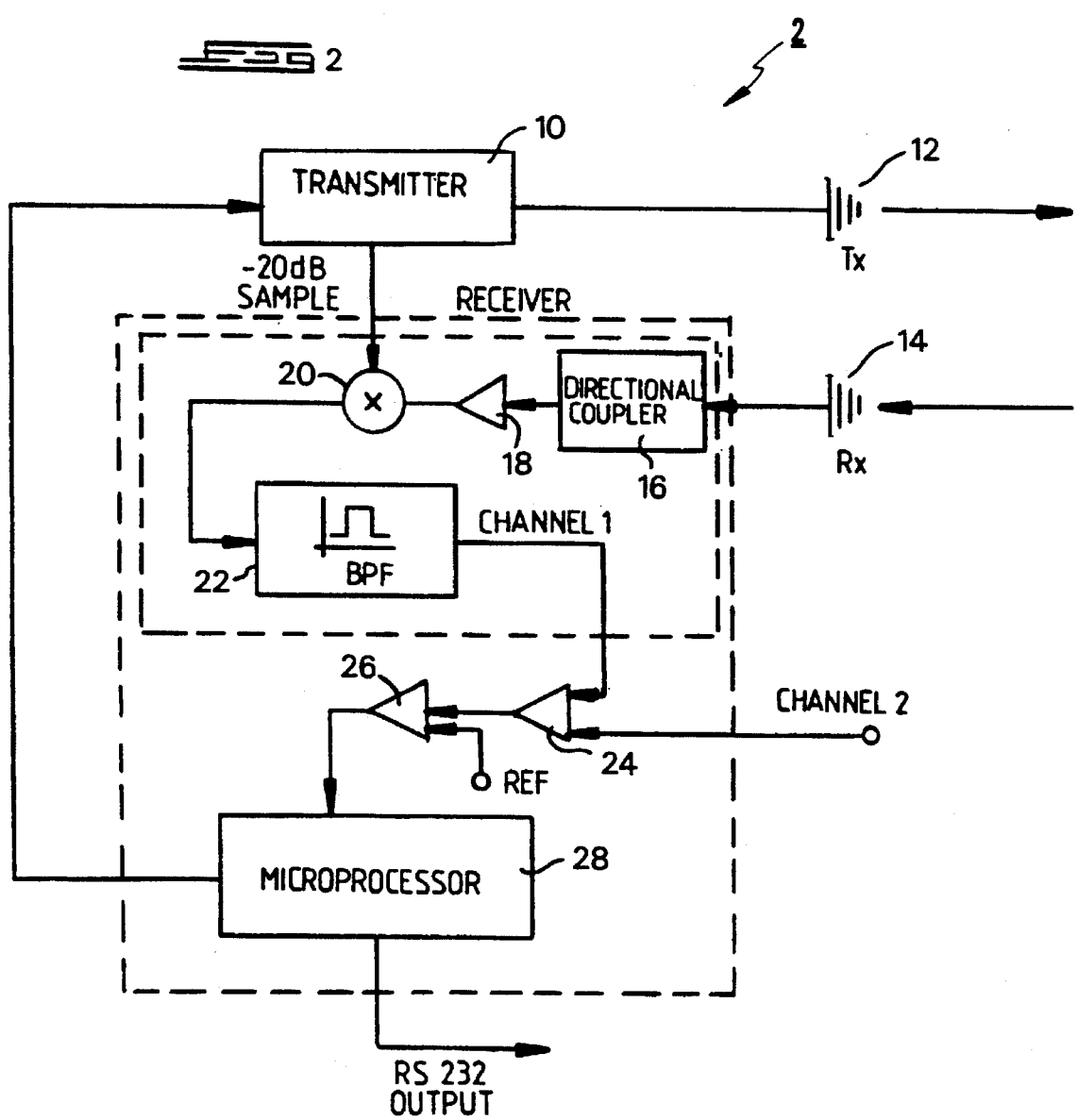

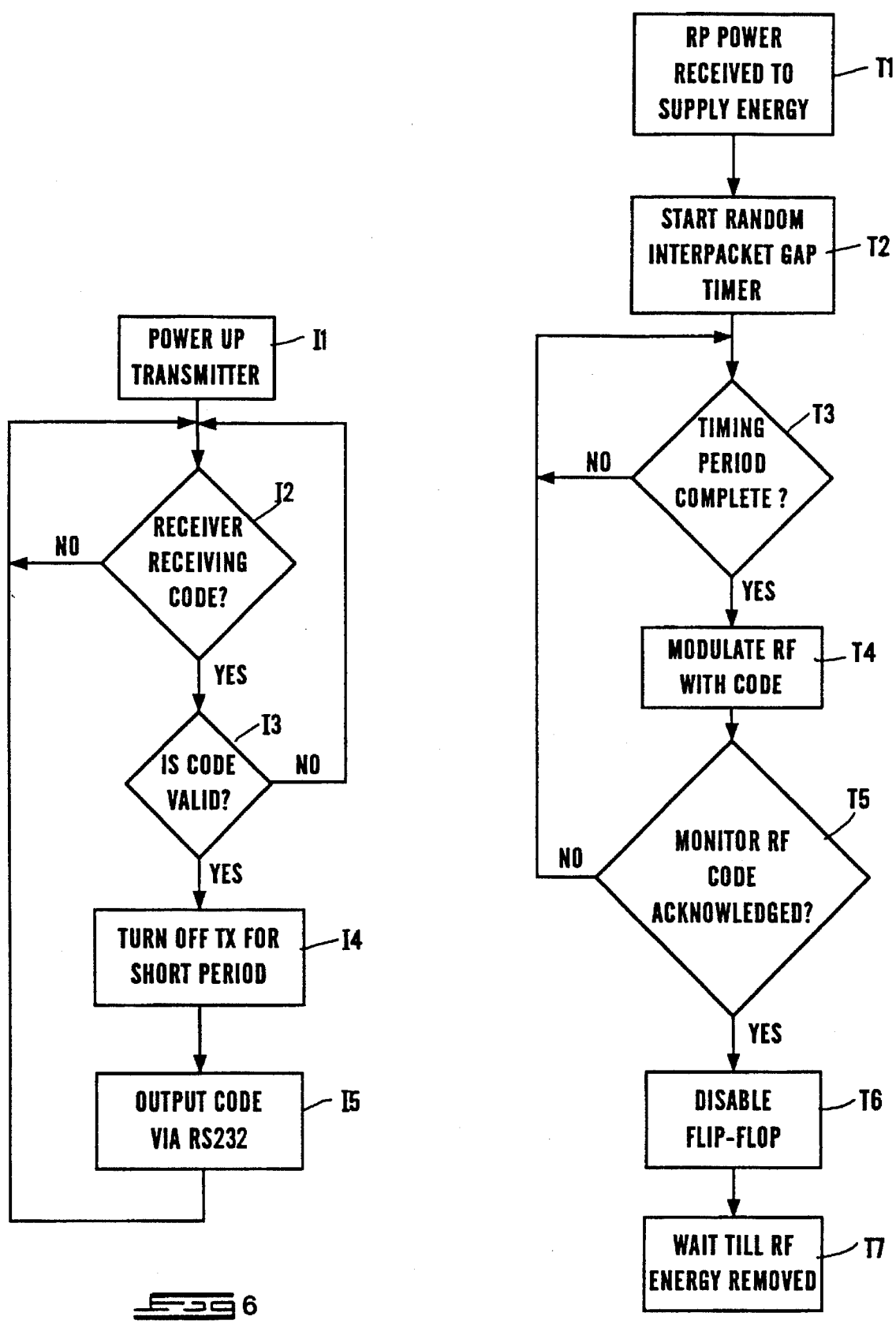

| SB | SA | MAX. SLOTS BETWEEN TRANSMISSIONS |
|---|---|---|
| 0 | 0 | 0 |
| 0 | 1 | 16 |
| 1 | 0 | 128 |
| 1 | 1 | 1024 |

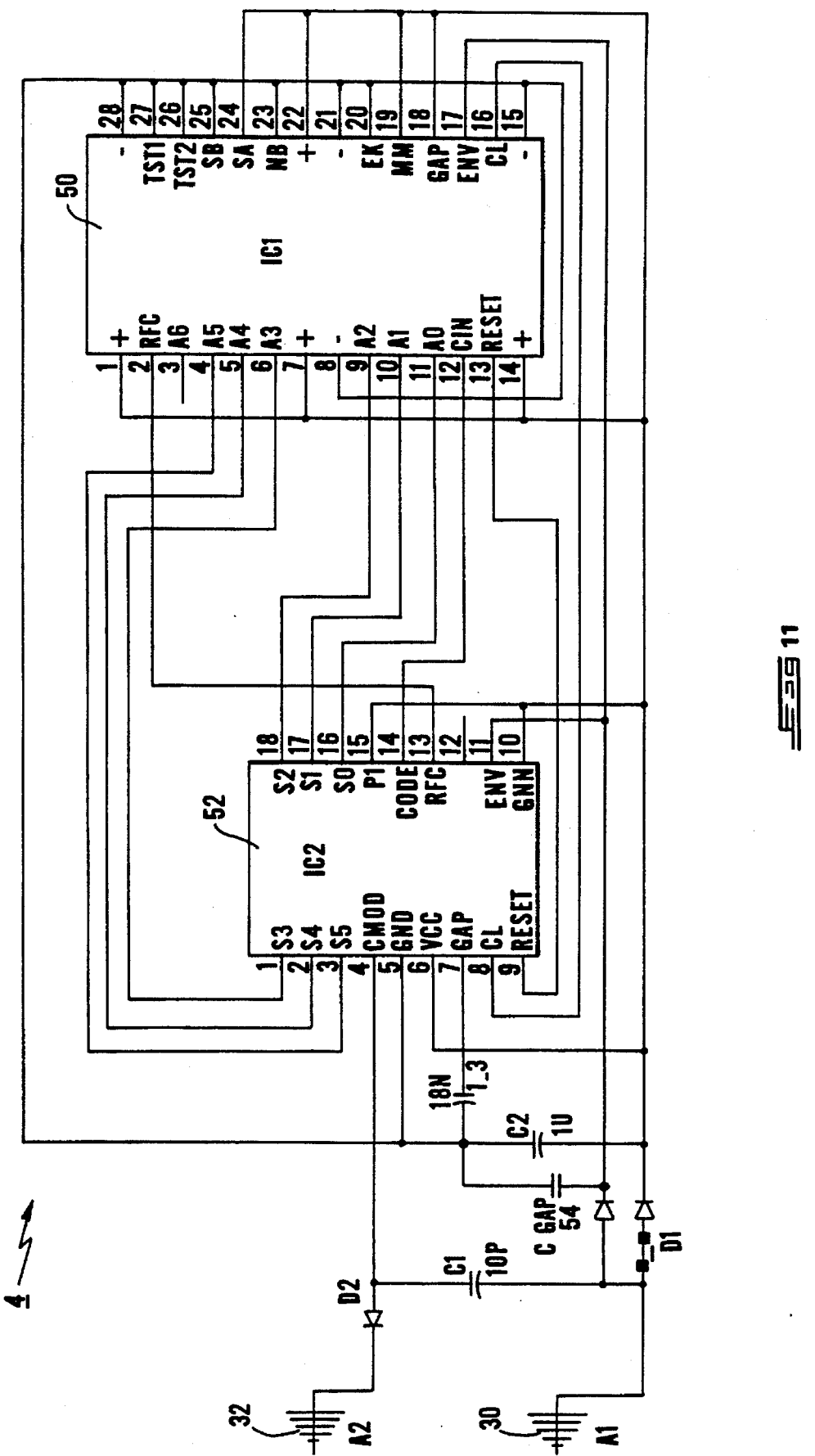

WAVEFORMS WITH GAP DETECTION AND SYNCHRONIZATION

WAVEFORMS WITH NO GAP DETECTION OR SYNCHRONIZATION

5,537,105

ELECTRONIC IDENTIFICATION SYSTEM

BACKGROUND OF THE INVENTION

This invention relates to an identification system comprising an interrogator and a plurality of transponders.

Interrogator/transponder systems have been used for identifying vehicles, animals, people and other objects. Such systems generally comprise an interrogator comprising a transmitter/receiver and a transponder attached to each object to be identified. The transponder carries a code which uniquely identifies the object in question. Systems of this kind can usually only deal effectively with one transponder at a time. Attempts to mass-produce low cost transponders have generally not been successful, due to the requirement for relatively expensive frequency-critical components in the transponder.

It is an object of the invention to provide transponders which can be produced at a relatively low cost, and an identification system employing such transponders.

SUMMARY OF THE INVENTION

According to the invention there is provided an identification system comprising an interrogator and a plurality of transponders, the interrogator including transmitter means for transmitting an interrogation signal to the transponder, receiver means for receiving a response signal from the transponder, and processor means for identifying the transponder from data in the response signal; each transponder comprising a receiving antenna for receiving the interrogation signal, a code generator, a transmitting antenna, and a modulator connected to the code generator, so that on receipt of the interrogation signal the transponder transmits a response signal containing data which identifies the transponder, the transponder being adapted to repeat the transmission of the response signal to increase the probability of successful reception thereof by the interrogator.

Preferably, the interrogator is adapted to detect successful identification of any transponder and to modify the interrogation signal to indicate the successful identification, each transponder including means responsive to a respective modification of the interrogation signal to cease transmission of its response signal.

The interrogator may be adapted to interrupt the interrogation signal for a predetermined period after successfully identifying a particular transponder, that transponder in turn being adapted to sense the interruption in the interrogation signal and to cease transmission of its response signal in response thereto.

The invention extends to a transponder for use with the identification system, the transponder comprising a receiving antenna for receiving the interrogation signal, a code generator, a transmitting antenna, and a modulator connected to the code generator, the transponder being adapted to transmit a response signal containing data which identifies the transponder, the transponder including control means arranged to cause repeated transmission of the response signal to increase the probability of successful reception thereof by the interrogator.

The control means may be responsive to a respective modification of the interrogation signal to cease transmission of the response signal.

Preferably, the control means is arranged to monitor the received interrogation signal and to disable the modulator on receipt of a predetermined confirmation signal from the interrogator which is received after successful reception of the response signal by the interrogator.

In one version of the transponder the modulator is arranged to divert a portion of the energy of the received interrogation signal to the transmitting antenna, so that on receipt of the interrogation signal, the transponder transmits a response signal comprising a carrier derived from the interrogation signal which is modulated by the output of the code generator.

BRIEF DESCRIPTION OF THE DRAWINGS

FIG. 1 is a simplified block diagram showing an interrogator (reader) and a transponder according to the invention;

FIG. 2 is a simplified block diagram of the interrogator of FIG. 1;

FIG. 6 is a simplified flow chart illustrating the operation of the interrogator;

FIG. 7 is a simplified flow chart illustrating the operation of each transponder;

FIG. 11 is a circuit diagram of an embodiment of the transponder;

DESCRIPTION OF EMBODIMENTS

FIG. 1 illustrates, in a very simplified form, an interrogator (reader) 2 interacting with a transponder 4 according to the invention. FIG. 2 illustrates the basic circuitry of the interrogator in greater detail.

The interrogator 2 includes a transmitter 10 which transmits a 915 MHz interrogation signal at a power of approximately 15 W via a transmitting antenna 12. The transponder 4 receives the interrogation signal and responds with a much weaker response signal at the same frequency, which is modulated with a code identifying the transponder and thus the object with which the transponder is associated. (Operation of the transponder is described below.)

Figure 3:
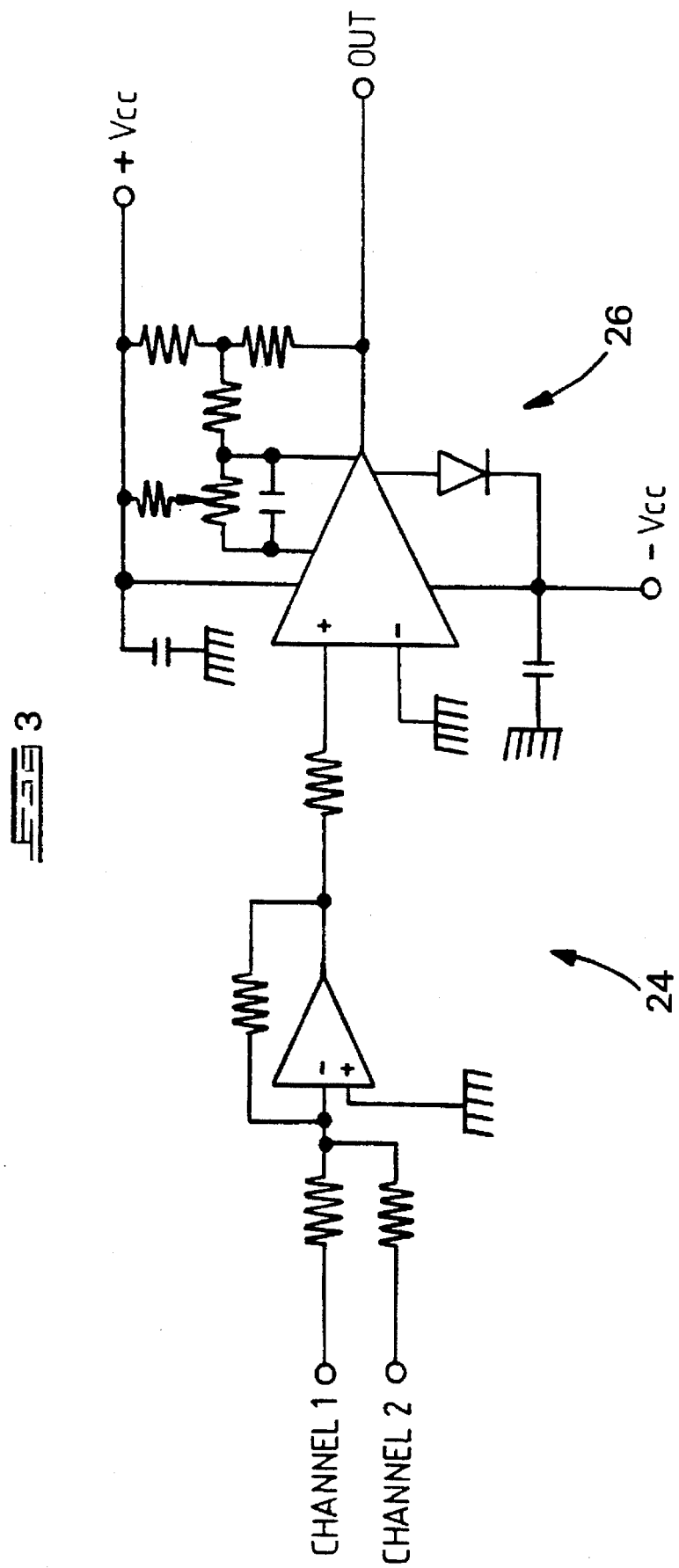
FIG. 3 is a schematic diagram of the amplifier and comparator of the interrogator of FIGS. 1 and 2.

The response signal from the transponder 4 is received by a receiving antenna 14 of the interrogator 2 and passed through a microstrip directional coupler 16, which attenuates excessively strong received signals, to an amplifier 18, before being fed to a mixer 20. The received signal has a carrier frequency which is the same as the transmitting frequency of the interrogator 2. The amplified received signal is mixed with a reference sample from the transmitter 10, and the resulting low frequency output is passed through a bandpass filter 22 and thence to an amplifier 24 and a comparator or threshold detector 26. The comparator squares the amplified output of the bandpass filter, so that its output is a digitally compatible output waveform containing the code transmitted by the transponder. One possible embodiment of a circuit block including the amplifier 24 and the comparator 26 is shown in FIG. 3. This output signal is fed to a microprocessor 28 which analyses the received code and checks its validity using conventional circular redundancy checking systems, before outputting the code for further processing.

It will be noted that the amplifier has a second input for use with a second receiver channel. This input is for use in a version of the transponder 4 with a spatial diversity antenna arrangement, in which two otherwise identical receiving antennas are spaced apart by one half wavelength. This ensures that if one antenna does not receive the interrogation signal adequately strongly, due for example to standing wave effects or the like, the second antenna will receive the interrogation signal. This improves the reliability of operation of the transponder system.

The microprocessor 28 is arranged to control the transmitter 10 to interrupt the output of the transmitter immediately after receipt of a valid identification code from a transponder. For example, immediately after receipt of a valid transmission from any transponder 4, the microprocessor shuts off the transmitter 10 for a brief period, say one millisecond.

Figure 4:
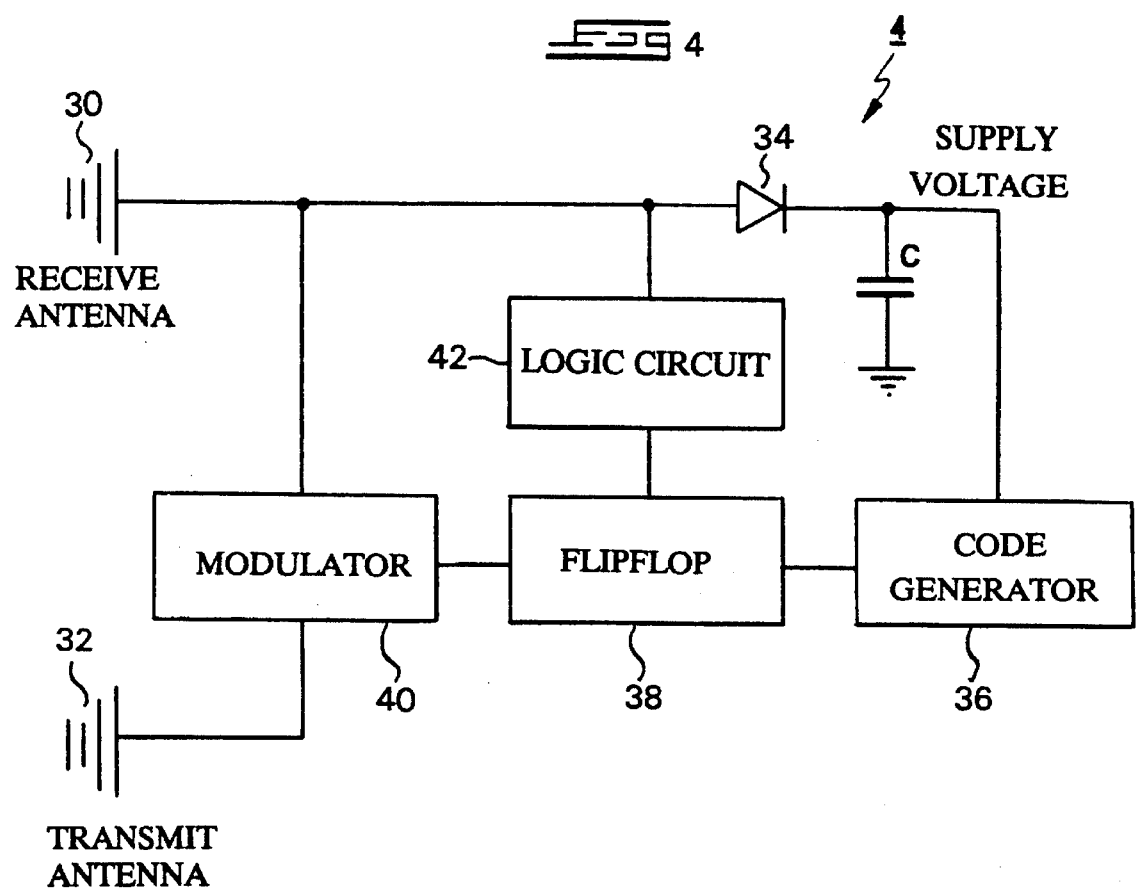
FIG. 4 is a block diagram of a transponder according to the invention.

FIG. 4 illustrates the transponder 4 itself. The transponder 4 includes a receiving antenna 30 and a transmitting antenna 32 which are typically defined by a printed circuit. The antennas 30 and 32 are cross polarised to minimise crosstalk. The receiving antenna is connected via a diode 34 to a charge storage device in the form of a capacitor C, which stores a portion of the energy of the interrogation signal received by the receiving antenna. When the capacitor C has charged sufficiently, it enables an integrated circuit code generator 36, which is pre-programmed with a unique code which is transmitted three times at approximately 1,200 baud. The output signal from the code generator is fed via a flipflop 38 to a modulator 40 which re-directs a portion of the energy received via the receiving antenna 30 to the transmitting antenna 32. The flipflop 38 is controlled by a logic circuit 40.

Because the modulator 40 uses the received interrogation signal as the transmitter source for its output carrier signal, no frequency critical components are required, as would be the case with an actively powered transmitter and modulator circuit. Thus, the transponder 4 can comprise a circuit board on which the receiving and transmitting antennas 30 and 32 are printed, together with one or more integrated circuits providing charge storage, code generation and modulating functions. It is also possible to combine the transmitting and receiving antennas in a single antenna. The modulator 40 is typically a diode which is reverse biased and which is biased into a conducting mode by pulses from the code generator to allow energy transfer from the receiving antenna 30 to the transmitting antenna 32.

Obviously, the receiving antenna 14 of the interrogator receives a strong component of the interrogation signal transmitted by its transmitting antenna 12. However, in view of the fact that mixing of two identical frequency components gives a DC component in the mixer, it is a relatively simple matter to remove this component by means of the bandpass filter 22, so that the received code is not contaminated. Thus, simultaneous transmission and reception on the same frequency is possible, as well as the use of a highly simplified transponder circuit.

In an alternative version of the transponder 4, the transponder 4 is provided with its own power supply, such as a battery, and can therefore use an input amplifier to improve its sensitivity. This allows the interrogator 2 to transmit at a significantly lower power, for example, at 100 mW instead of 15 W. This is because the interrogation signal does not need to contain sufficient energy to power the transponder in this application. A transmitting power of 100 mW has been found to be adequate for a reading distance of 4m. However, the embodiment illustrated in FIG. 4 is particularly advantageous, due to its compatibility with ultra low cost mass production techniques, which facilitates multiple article identification as described below.

When the interrogator 2 receives response signals from several transponders 4 which have been interrogated at the same time, it will occur from time to time that two or more transponders 4 are transmitting during the same period, notwithstanding the fact that there is a random or pseudo-random delay between transmissions from each transponder 4, so that the transponders 4 effectively "jam" each other. This will generally prevent correct reception of the code transmitted by either transponder. However, provided that the codes transmitted by the transponders are fixed in length and include error correction bits, such as CRC codes (See FIGS. 8 and 9), it is possible for the interrogator 2 to confirm whether or not it has received a valid code. As mentioned above, as soon as a code is validly received, the interrogation signal is interrupted briefly, for a period shorter than the length of a transponder transmission.

The logic circuit 42 in each transponder 4 monitors the presence of the interrogation signal at the output of the receiving antenna 30. As soon as the logic circuit detects the interruption in the interrogation signal following on the completion of the last transmission by the transponder 4, the flipflop 38 is set, disabling the modulator 40 and thus stopping the transmission from that transponder.

Figure 5:
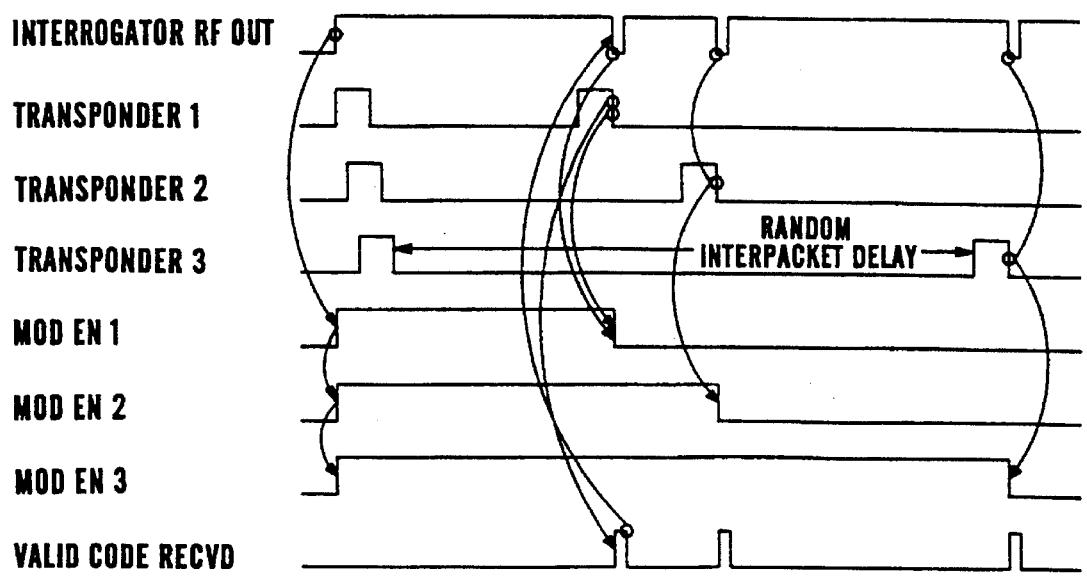
FIG. 5 is a timing diagram illustrating the operation of the interrogator and three transponders.

The timing diagram of FIG. 5 illustrates the interaction of the interrogator 2 and three transponders 4, while the flow charts of FIGS. 6 and 7 illustrate the sequence of operation of the interrogator (I1–I5) and the transponders (T1–T7), respectively.

The effect of the above arrangement is that each transponder 4 ceases to transmit as soon as it has successfully transmitted its identification code to the interrogator 2. As each transponder shuts down, more interference-free time is created within which other transponders in a group of such transponders can transmit their signals to the interrogator. This process continues until all of the transponders have successfully transmitted their identification code to the interrogator. The microprocessor can count the number of transponders identified.

Assuming that all transponders 4 have the same identification code, it is thus possible for the interrogator 27 to count the number of transponders 4 which respond to the interrogation signal in a particular time period. For example, a large number of identical articles can each be provided with a transponder, all the transponders having the same identification code, and a portable interrogator unit can be used to count the articles. This can be done, for example, in a warehouse or other storage area, and obviates the necessity for physically counting stock. The transponders 4 can be fitted to individual articles, or to containers such as boxes, each of which contains a known number of articles. It will be appreciated that it is not even necessary for the articles which are fitted with transponders 4 to be visible for them to be counted in this way. Conveniently, the antennas 30 and 32 (or a single dual-purpose antenna) can be printed on a surface of the container using conductive ink, while the electronic circuitry of the transponder is secured to the surface in electrical contact with the antenna(s). Such an embodiment can be produced very inexpensively using the passive transponder 4 embodiment described above, making it possible to use the transponders in an automatic stock control system for relatively low cost articles.

Because of the low cost of the passive transponders 4, it is proposed, eventually, that a transponder can be attached to each item of stock in a supermarket, for example, so that a trolley full of groceries can be scanned automatically by an interrogator 2 located at a till, without any handling of the goods by a cashier being required. This is possible because the invention makes it possible both to identify each item in a group of different items, as well as to count the number of each type of item present. Obviously, the cost of the transponders 4 would determine the value of the articles to which they can viably be applied. However, with present day technology, the transponders 4 can be produced at a cost low enough for them to be used economically with medium-priced articles such as domestic appliances, applied to disposable packaging.

In a further development of the invention, the interrogation signal can be modulated intermittently with a code signal corresponding to the identity of one or more transponders 4, or a designated class of transponders, which are being sought. The logic circuit 42 of each transponder 4 then checks the transmitted code in the interrogation signal, and activates the transponder only if it is one of those transponders corresponding to the transmitted code. Other transponders remain disabled. Once all transponders in a particular category have been identified and/or counted, the interrogation signal is removed to allow the charge storage device in the transponders to discharge, and the code in the interrogation signal is then be changed to allow a new category of transponders to be interrogated.

Figure 8:
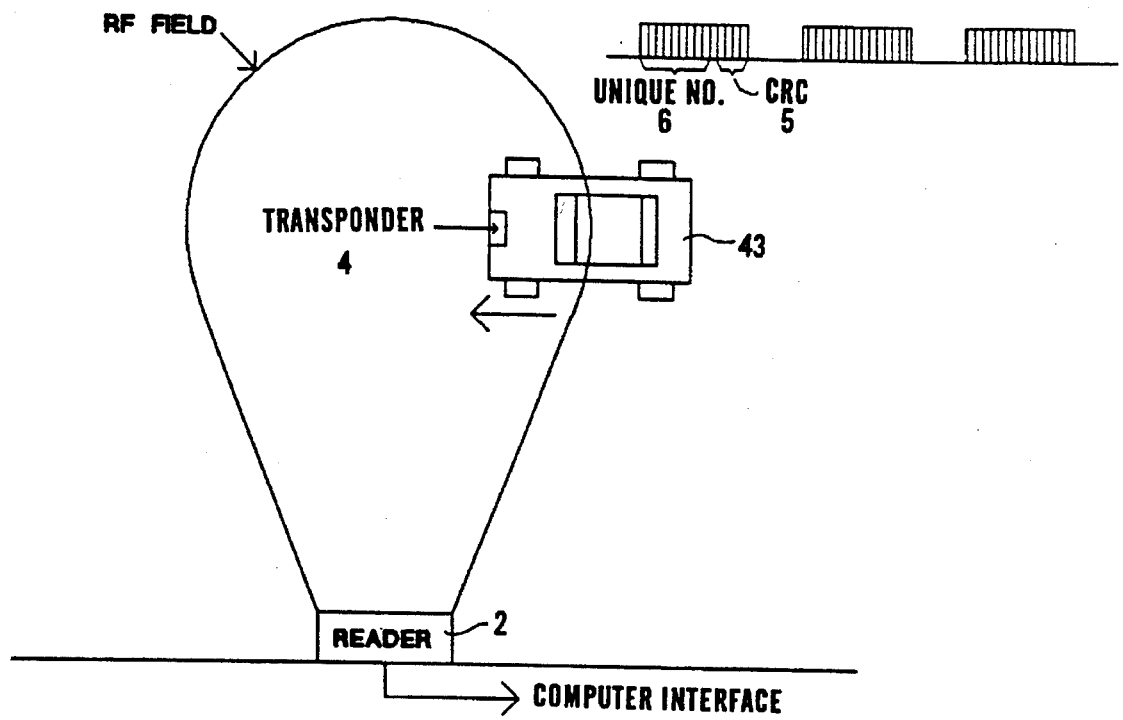
FIGS. 8 and 9 are schematic illustrations of two applications of the invention.
Figure 9:
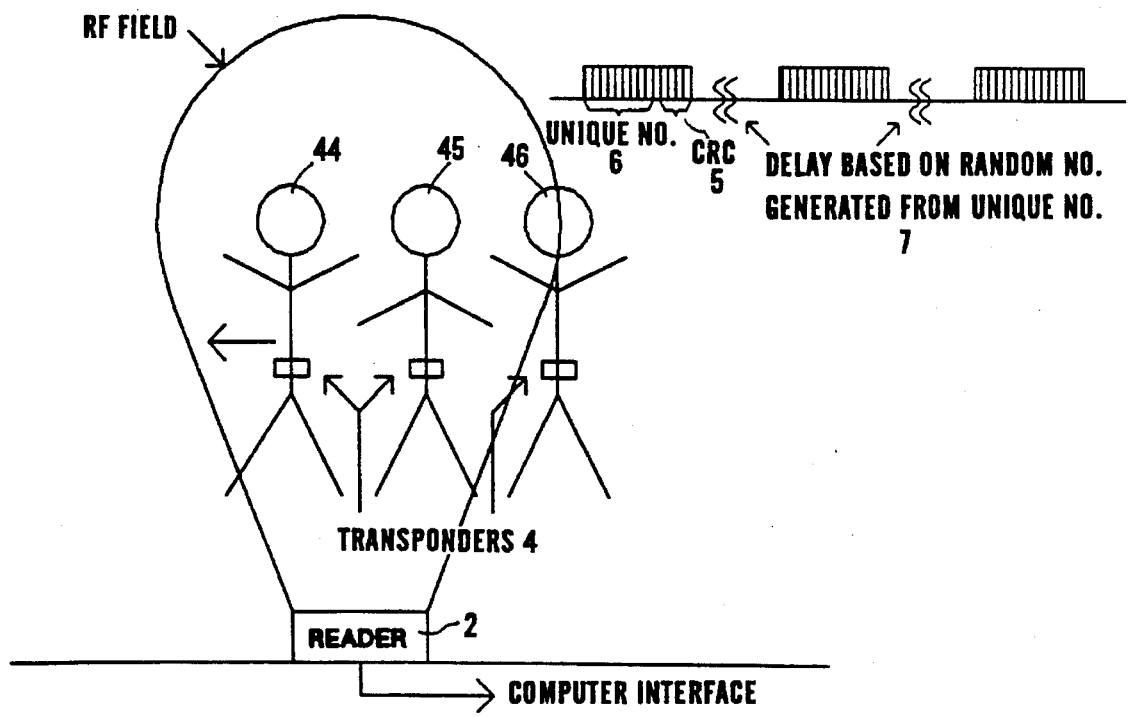

Two further applications of the transponder are schematically illustrated in FIGS. 8 and 9. The application illustrated in FIG. 8 is for vehicle identification, where one vehicle 42 or several vehicles can be identified at a time. In the application illustrated schematically in FIG. 9, the system is used to identify the members of a group of people 44, 46, 48, who may pass the interrogator simultaneously. In conventional systems, simultaneous interrogation of a number of transponders would result in simultaneous transmission from the transponders 4, making it impossible to read the transmitted data. However, the code generator 36 of each transponder 4 transmits its unique code 6 three times, with a spacing between transmissions which is pseudo-randomly determined based on the identification code of that transponder itself. This assists in allowing each transponder to have a "quiet time" when it is the only unit radiating.

Another application for the transponders is in identifying personnel, as shown in FIG. 9. Tests have been conducted in which transponders according to the invention were fitted to the battery boxes of miner's cap lamps. In this case, powered versions of the transponders were used, due to the ready availability of battery power. Interrogators are placed at desired locations, for example at the entrances to mine haulages or stopes, and can count personnel entering demarcated areas, as well as identifying each person individually. The individual interrogators are connected to a central computer, which can monitor the movement of personnel in the mine, and which can generate a map or other display, if required, indicating the location of each individual. This is particularly useful in emergencies, allowing rescue parties to know how many individuals are trapped in a certain area after a rock fall, for example.

A prototype system, employing a 915 MHz interrogation signal of 15 W, can effectively read transponders in the form of badges the size of a credit card at a distance of approximately 4m. 64 bit identification codes were used in the prototype, allowing a large number of uniquely identified transponders to be provided.

A prototype of the transponder was developed using two custom made integrated circuits IC1 (50) and IC2 (52). The first integrated circuit 50, IC1, is designated type CLA 61061 and is a CMOS Manchester encoder with a pseudo random delay function. This device is designed for the serial transmission of either a 64 bit or a 128 bit word in Manchester II format, at pseudo random intervals. The chip also provides addressing for a memory device in which the word to be transmitted (that is, the identification code) is stored, and logic control of the timing sequence of operation.

The integrated circuit IC2 (52) is designated type */047 and comprises a bipolar analogue PROM, an oscillator, and a power-on-reset circuit on a single chip. The chip also includes a "gap detector" circuit and circuitry for rectifying and modulating an RF carrier. The RF circuitry can be bypassed in part or completely, to make use of special high frequency rectifying diodes. The PROM is a 64 bit memory implemented with aluminium fuses which are selectively blown before packaging of the chip, to store a selected identification code.

Figures 10, 14:
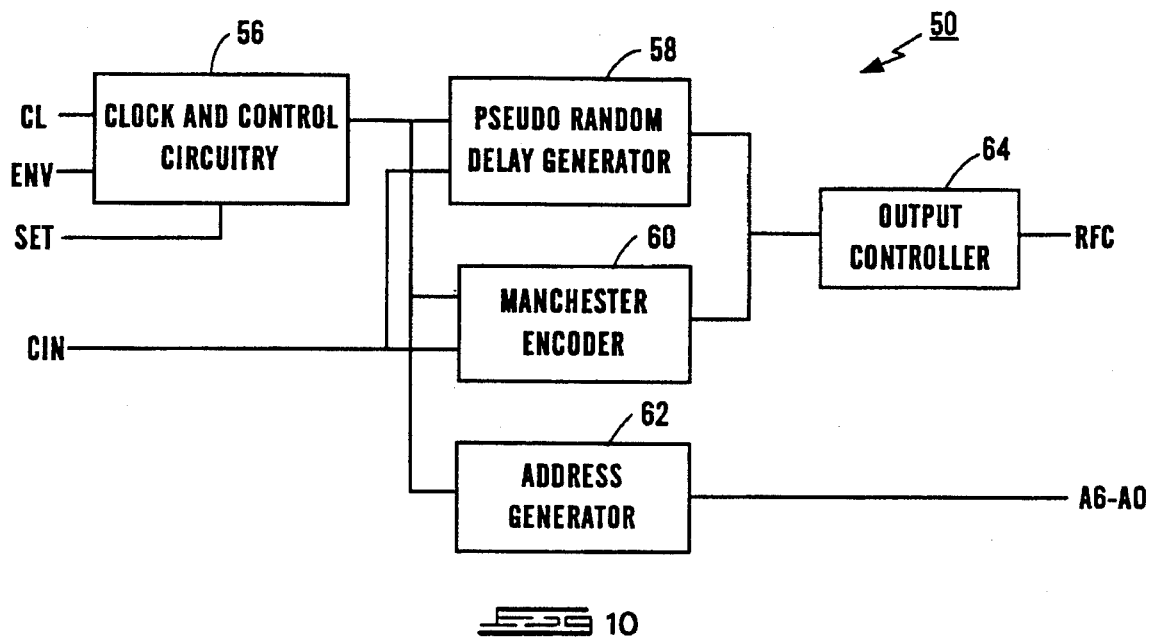
FIG. 10 is a functional block diagram of an integrated circuit employed in the transponder.
FIG. 14 is a table showing the response of the integrated circuit of FIG. 10 to different control signals.

FIG. 10 is a functional block diagram of the integrated circuit IC1 (50) which comprises clock and control circuitry 56, pseudo random delay generator 58, manchester encoder 60, address generator 62 and output controller 64, and FIG. 11 illustrates one possible implementation of a transponder using the two integrated circuits. In FIG. 11, a capacitor $C_{gap}$ is provided for systems in which the transponder waits for a "gap" or quiet period before responding to an interrogation signal.

Figure 12:
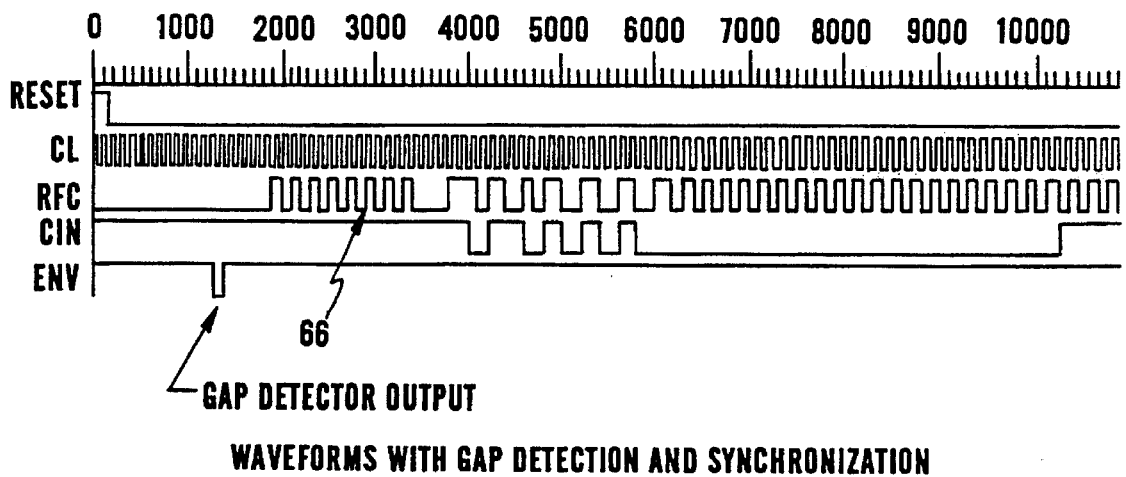
FIGS. 12 and 13 are typical waveforms generated by the transponder and interrogator.
Figure 13:
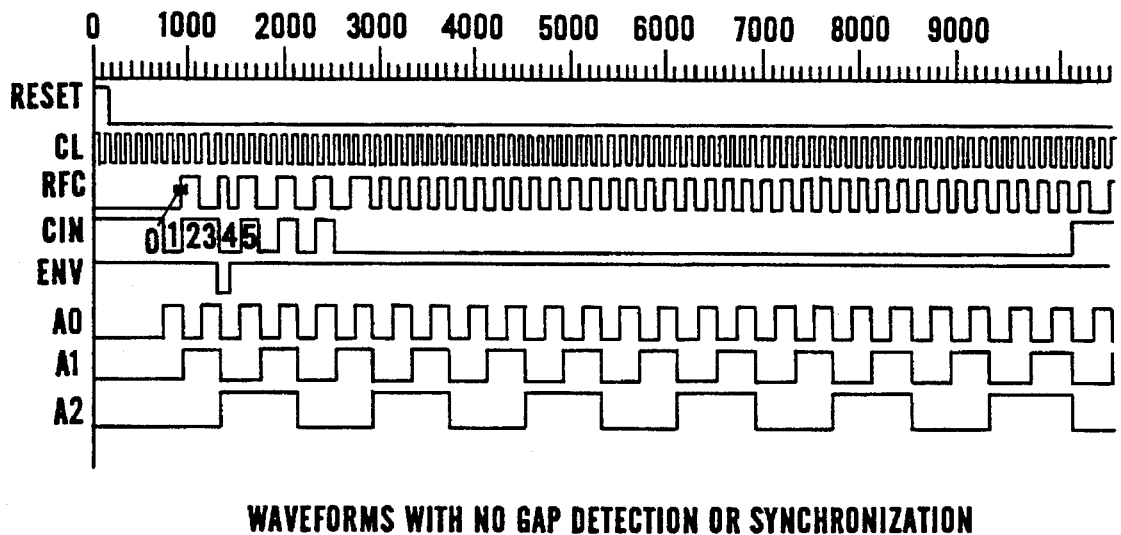

In FIG. 12, the RFC pulse train includes a set of synchronisation pulses 66, which can be omitted in applications where it is necessary to save time, or where the coding of the received signal is performed in software (see FIG. 13).

On start-up of the integrated circuit IC1, the memory device (IC2) is addressed and the Manchester data sequence is transmitted. The internal pseudo random number generator of the chip IC2 is loaded with the last 16 bits of the data in the memory device, which determine a pseudo random time interval before the Manchester sequence is transmitted again. The maximum length of the interval is a multiple of the length of the time taken to transmit one Manchester sequence. The integrated circuit IC1 has a number of control pins which allow its operation to be modified as required. The pins SA and SB (see FIG. 11) control the time interval between data transmission, in accordance with the table of FIG. 14. In FIG. 14, each "slot" referred to in the third column of the table is equal to the length of a single Manchester sequence transmission.

Start-up of the integrated circuit IC1 can be initiated in one of two ways, determined by the status of the pin GAP. In the first mode, operation starts as soon as the RESET pin goes low, while in the second mode, operation starts after the RESET pin goes low and a rising edge is presented to the ENV pin. This is used to delay transmission from the transponder until a low-going pulse has been presented to the ENV pin by the logic circuit 42, which provides the "gap detection" or "quiet period" detection function referred to above.

The status of the pin MM determines the appearance of the Manchester sequence. If the pin MM is high, the data in the memory device is transmitted as a simple sequence of Manchester bits with no synchronisation pulses. With the pin MM low, the Manchester sequence starts with eight Manchester 0's for synchronisation and a command synchronisation sequence before transmitting the data bytes. The pin EK, when high, enables the termination of transmission after three transmissions of the Manchester sequence. If the pin EK is held low, transmission continues until the integrated circuit is powered down or reset. The status of the pin NB determines the length of the sequence that is transmitted. If the pin NB is held low, addressing for 64 bits is provided and 64 bits are transmitted. With the pin NB held high, 128 bits are addressed and transmitted. Both integrated circuits are designed to operate at low voltages of 2 V or less, and to draw low currents of less than 1 mA.

We claim:

1. An identification system comprising an interrogator and a plurality of transponders, the interrogator including transmitter means for transmitting an interrogation signal to the plurality of transponders and further for transmitting disabling signals to the plurality of transponders, receiver means for receiving response signals from any of the plurality of transponders, and processor means for identifying any transponder from data in its response signal; each transponder comprising receiving means for receiving the interrogation signal, a code generator for generating data identifying the transponder, transmitting means, connected to the code generator, so that on receipt of the interrogation signal each transponder transmits a response signal containing identification data, and control means including monitoring means for detecting a disabling signal from the interrogator; the interrogator being adapted to receive a response signal from any transponder, to determine whether the response signal has been validly received and thus to identify the transponder transmitting the response signal which has been validly received, and to transmit a disabling signal to the transponders just after such identification, the disabling signal being ignored by all of the transponders except that one which has completed transmission of its response signal a predetermined time before receipt of the disabling signal, the control means of that one transponder responding to the disabling signal to disable the transmitter means of the transponder temporarily.

2. An identification system comprising an interrogator and a plurality of transponders, the interrogator including transmitter means for transmitting a common interrogation signal to the plurality of transponders, receiver means for receiving response signals from any of the plurality of transponders, and processor means for identifying any transponder from data in its response signal and for counting the number of transponders thus identified; each transponder comprising receiving means for receiving the interrogation signal, a code generator for generating data identifying the transponder, control means responsive to a disabling signal from the interrogator, and transmitting means, connected to the code generator, so that on receipt of the interrogation signal each transponder transmits a response signal containing identification data, the plurality of transponders including at least one group of transponders arranged to generate response signals containing identical identification data, the interrogator being adapted to receive a response signal from any transponder, to determine whether the response signal has been validly received and thus to identify the transponder transmitting the response signal which has been validly received, to count the number of successful identifications of transponders in at least one group, and to transmit a disabling signal just after such identification to which the identified transponder in question is responsive to cease transmission of its response signal.

3. An identification system comprising:
a plurality of transponders; and
an interrogator having
  means for transmitting a first signal to said plurality of transponders,
  means for receiving a second signal having an identification data from any of said plurality of transponders,
  means for determining whether the identification data in the second signals has been validly received, and
  means for identifying said plurality of transponders from the validly received identification data;
  means for generating a third signal to said transmitting means to alter the first signal upon identification of any one of said plurality of transponders based on the valid identification data.

4. The identification system of claim 3, wherein each transponder comprises:
  means for receiving the first signal;
  means for generating the identification data;
  means, coupled to said generating means, for transmitting a second signal having the identification data upon receipt of the first signal from said interrogator, wherein said interrogator is adapted to receive the second signal having the identification data from any of said plurality of transponders and to identify any of said plurality of transponders transmitting the second signal, and to alter the first signal;
  control means, responsive to an alteration of the interrogation signal, for ending the transmission of the second signal.

5. The identification system of claim 3, wherein the identification data of each of said plurality of transponders is identical, and said identifying means counts the number of transponders identified.

6. The identification system of claim 3, wherein the first signal is altered by a temporary interruption of the first signal in response to the third control signal to said transmitting means.

7. The identification system of claim 3, wherein the first signal is altered by temporarily turning off the transmitting means.

8. An identification system comprising:
a plurality of transponders; and
an interrogator having
  transmitter means for transmitting an interrogation signal to said plurality of transponders,
  receiver means for receiving response signals from any of said plurality of transponders, and
  processor means for determining whether a response signal has been validly received, for identifying any of said plurality of transponders from identification data in the validly reached response signal, and for altering the transmitted interrogation signal, wherein
each transponder has receiving means for receiving the interrogation signal, a code generator for generating data identifying the transponder, and transmitting means, connected to the code generator, for transmitting the response signal having the identification data upon receipt of the interrogation signal, and control means, responsive to an alteration of the interrogation signal, for ending the transmission of the response signal.

9. An identification system comprising an interrogator and a plurality of transponders, the interrogator including transmitter means for transmitting an interrogation signal to the plurality of transponders, receiver means for receiving response signals from any of the plurality of transponders, and processor means for identifying any transponders from data in its response signal and for generating a control signal which is applied to the transmitter means to cause the transmitter means to modify the transmitted interrogation signal; each transponder comprising receiving means for receiving the interrogation signal, a code generator for generating data identifying the transponder, and transmitting means connected to the code generator, so that on receipt of the interrogation signal each transponder transmits a response signal containing identification data, the interrogator being adapted to receive a response signal from any transponder, to determine whether the identification data in the response signal has been validly received and thus to identify the transponder transmitting the response signal which has been validly received, and to alter a characteristic of the interrogation signal in response to such successful identification, each transponder including control means responsive to such an alteration of the interrogation signal to cease transmission of its response signal.

10. An interrogator for identifying a prescribed source comprising:
   means for transmitting a first signal to the prescribed source;
   means for receiving a second signal having an identification data from the prescribed source;
   means for determining whether the identification data in the second signals has been validly received; and
   means for identifying the prescribed source from the valid identification data;
   means for generating a third signal to said transmitting means to alter the first signal upon identification of the prescribed source.

11. A transponder comprising:
   means for receiving a first signal;
   means for generating an identification data in response to the first signal;
   means, coupled to said generating means, for transmitting a second signal having the identification data upon receipt of the first signal from said interrogator; and
   control means, responsive to a modification of the interrogation signal, for ending the transmission of the second signal.

12. The identification system of claim 3, wherein the alteration of the first signal has a predetermined timing relationship with at least one parameter of the second signal.

13. The identification system of claim 8, wherein the modification of the interrogation signal has a predetermined timing relationship with at least one parameter of the received response signal.

14. The identification system of claim 9, wherein the alteration of the interrogation signal has a predetermined timing relationship with at least one parameter of the received response signal.

15. The interrogator of claim 10, wherein the alteration of the first signal has a predetermined timing relationship with at least one parameter of the second signal.

16. The transponder of claim 11, wherein the modification of the first signal has a predetermined timing relationship with at least one parameter of the second signal.

17. The identification system of claim 8, wherein the identification signal of each of said plurality of transponders is identical.

18. The identification system of claim 9, wherein the identification data of each of said plurality of transponders is identical.

19. The identification system of claim 8, wherein the alteration of the interrogation signal comprises a temporary interruption of the interrogation signal.

20. The identification system of claim 9, wherein the alteration of the interrogation signal comprises a temporary interruption of the interrogation signal.

21. The interrogator of claim 10, wherein the first signal is altered by a temporary interruption of the first signal in response to the third signal to said transmitting means.

22. The identification system of claim 11, wherein the modification of the first signal comprises a temporary interruption of the interrogation signal.

23. An identification system comprising an interrogator and a plurality of transponders, the interrogator including transmitter means for transmitting a continuous interrogation signal to the plurality of transponders, receiver means for receiving response signals from any of the plurality of transponders, and processor means for identifying any transponders from data in its response signal and for generating a control signal which is applied to the transmitter means in response to each identification of a transponder to cause the transmitter means to interrupt the transmitted interrogation signal; each transponder comprising receiving means for receiving the interrogation signal, a code generator for generating data identifying the transponder, and transmitting means connected to the code generator, so that on receipt of the interrogation signal each transponder transmits a response signal containing identification data at randomly varying intervals, the interrogator being adapted to receive a response signal from any transponder, to determine whether the identification data in the response signal has been validly received and thus to identify the transponder transmitting the response signal which has been validly received, and to interrupt the interrogation signal in response to and just after such successful identification for a period which is less than the duration of a transponder response signal, each transponder including control means responsive to such an interruption of the interrogation signal to cease transmission of its response signal, wherein the transponder comprises
   receiving means for receiving the interrogation signal,
   a code generator, and
   transmitting means connected to the code generator, the transponder being adapted to transmit a response signal containing data which identifies the transponder, the transponder including control means responsive to a modification of the interrogation signal, following successful identification of the transponder, to cease transmission of the response signal.

24. An identification system comprising an interrogator and a plurality of transponders, the interrogator including transmitter means for transmitting a continuous interrogation signal to the plurality of transponders, receiver means for receiving response signals from any of the plurality of transponders, and processor means for identifying any transponders from data in its response signal and for generating a control signal which is applied to the transmitter means in response to each identification of a transponder to cause the transmitter means to interrupt the transmitted interrogation signal; each transponder comprising receiving means for receiving the interrogation signal, a code generator for generating data identifying the transponder, and transmitting means connected to the code generator, so that on receipt of the interrogation signal each transponder transmits a response signal containing identification data at randomly varying intervals, the interrogator being adapted to receive a response signal from any transponder, to determine whether the identification data in the response signal has been validly received and thus to identify the transponder transmitting the response signal which has been validly received, and to interrupt the interrogation signal in response to and just after such successful identification for a period which is less than the duration of a transponder response signal, each transponder including control means responsive to such an interruption of the interrogation signal to cease transmission of its response signal.

25. An identification system according to claim 24 wherein the plurality of transponders includes at least one group of transponders which generate response signals containing identical identification data, the processor means of the interrogator being adapted to count the number of successful identifications of transponders in said at least one group.

26. An identification system according to claim 25 wherein the interrogation signal is a common interrogation signal to which all of the transponders in at least one group of transponders are responsive, each transponder in said at least one group responding independently to the common interrogation signal and being disabled by modification of the common interrogation signal directly after successful identification of that transponder, so that the transponders in said at least one group are successively disabled as they are identified or counted.

27. An identification system according to claim 24 wherein the modification of the interrogation signal has a predetermined timing relationship with the received response signal.

28. An identification system according to claim 27 wherein the interrogator is adapted to interrupt the interrogation signal a predetermined time after successful identification of a particular transponder, that transponder being adapted in turn to sense the interruption in the interrogation signal and to cease transmission of its response signal.

29. An identification system according to claim 27 wherein the interrogator is adapted to interrupt the interrogation signal for a predetermined period after successful identification of a particular transponder.

30. An identification system according to claim 29 wherein the predetermined period for which the interrogation signal is interrupted is shorter than the duration of the transponder response signals.

31. An identification system according to claim 24 wherein each transponder includes logic means for controlling the transmission of the response signal, the logic means being adapted to cause repeated transmissions of the response signal at predetermined intervals to increase the probability of successful reception thereof by the interrogator.

32. An identification system according to claim 31 wherein the predetermined intervals are random or pseudo-random in length.

33. An identification system according to claim 32 wherein the length of the random or pseudo-random intervals is derived from the data identifying the transponder.

34. An identification system according to claim 24 wherein the interrogator is adapted to transmit a code identifying a predetermined transponder or category of transponders, each transponder including circuitry for enabling the transponder only on receipt of the code corresponding thereto.

35. An identification system according to claim 24 wherein the transmitting means of each transponder includes a transmitting antenna and a modulator arranged to divert a portion of the energy of the received interrogation signal to the transmitting antenna, so that on receipt of the interrogation signal, the transponder transmits a response signal comprising a carrier derived from the interrogation signal which is modulated by the output of the code generator.

36. An identification system according to claim 35 wherein the interrogator includes a mixer for mixing a reference signal derived from the interrogation signal with the received response signal from the transponder, and filter means for extracting a different signal from the mixer output which contains the data from the response signal.

37. A transponder according to claim 24 wherein the transmitting means comprises a transmitting antenna and a modulator arranged to divert a portion of the energy of the received interrogation signal to the transmitting antenna, so that on receipt of the interrogation signal, the transponder transmits a response signal comprising a carrier derived from the interrogation signal which is modulated by the output of the code generator.

38. A transponder according to claim 24 wherein the control means is arranged to monitor the received interrogation signal and to disable the modulator on detecting a modification of the interrogation signal which occurs just after successful reception of the response signal by the interrogator.

39. A transponder according to claim 38 wherein the modification of the interrogation signal occurs a predetermined time after successful reception of the response signal by the interrogator.

40. A transponder according to claim 38 wherein the control means includes logic means adapted to detect a modification of the interrogation signal comprising an interruption of the interrogation signal for a predetermined period.

41. A transponder according to claim 24 including charge storage means arranged to store a portion of the energy of the interrogation signal, at least the code generator being arranged to be powered by the charge storage means in operation.

42. A transponder according to claim 40 wherein the logic means is adapted to monitor the received interrogation signal for a predetermined code, and to enable the modulator only on receipt of that code.

43. A transponder according to claim 24 wherein at least one of the receiving and transmitting means comprises a respective receiving or transmitting antenna which is formed on a substrate to which the transponder is applied.

44. A transponder according to claim 43 wherein at least one antenna is formed by printing on the substrate with a conductive material.

45. A transponder according to claim 24 wherein the control means is adapted to cause repeated transmission of the response signal at predetermined intervals to increase the probability of successful reception thereof by the interrogator.

46. A transponder according to claim 45 wherein the predetermined intervals are random or pseudo-random in length.

47. A transponder according to claim 46 wherein the length of the random or pseudo-random intervals is derived from the data identifying the transponder.

* * * * *